I. W. Hoagland,
Wood Auger.
N° 12,551.  Patented Mar. 20, 1855.

UNITED STATES PATENT OFFICE.

ISAAC W. HOAGLAND, OF JERSEY CITY, NEW JERSEY.

SHIP-AUGER.

Specification of Letters Patent No. 12,551, dated March 20, 1855.

*To all whom it may concern:*

Be it known that I, ISAAC W. HOAGLAND, of Jersey City, in the county of Hudson and State of New Jersey, have invented a new and useful Improvement in Augers; and I do hereby declare that the following is a full, clear, and exact description of the same, reference being had to the annexed drawings, making a part of this specification, in which—

Figure 1:
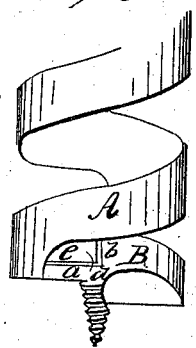
Figure 2:
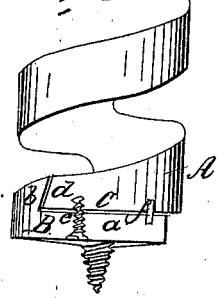
Figure 3:
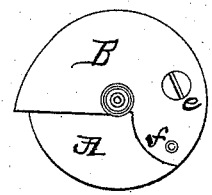
Figure 4:
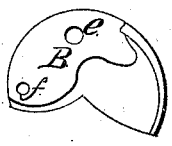
Figure 10:
Figure 6:
Figure 8:
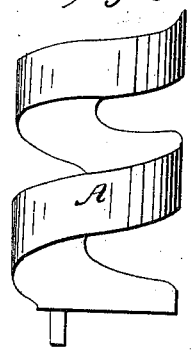
Figure 5:
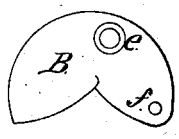
Figure 7:
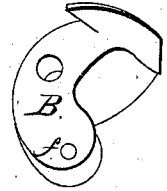
Figure 9:
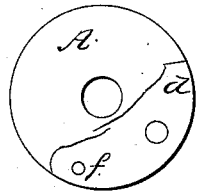

Figures 1 and 2, are side views of a portion of the screw, and the cutting edge of my improved auger, one view being taken at a side opposite to that of the other. Fig. 3 is an under view of the same. Fig. 4, the bit, or additional piece, B, showing the side by which it is connected with the auger stock. Fig. 5, the same piece, showing the under or cutting side, the bit, in all these diagrams, being represented without the worm or screw—which is now generally omitted in my auger. Fig. 6, an edge view of the same. Fig. 7, perspective view of the same, the upper side being shown, that is the side by which it is joined to the auger stock. Fig. 8, part of the auger stock showing the pin which is permanent in the stock and fits into the hole, $f$, in the bit. Fig. 9, the auger stock end or bottom view—showing the pin at, $f$, and the screw-hole at, $e$, and the dovetail point at, $d$. Fig. 10, shows the kind of screw used to fasten on the bit.

Similar letters of reference indicate corresponding parts in the several figures.

The nature of my invention consists in having the cutting portion of the auger, made detached from the screw portion, and attaching the cutting portion to the screw portion by means of dowels and screws, the cutting portion being fitted to the screw portion in dovetail form, as will be hereafter described.

To enable others skilled in the art, to fully understand and construct my invention, I will proceed to describe it.

A, represents a portion of the screw of an auger, constructed in the usual manner, and B, is the cutting portion which is made detached from the screw, A. The upper part of the cutting portion, B, has a flat surface, ($a$) adjoining an oblique shoulder, ($b$) and the under surface of the screw, A, has also a corresponding flat surface, ($c$) and an inclined or oblique end, ($d$) corresponding inversely with the shoulder, ($b$) on the cutting portion, B, (see Figs. 1, 2.) The flat surface, ($a$) of the cutting portion, B, is placed against the flat surface, ($c$) on the under side of the screw, A, and the shoulder, ($b$) on the cutting portion, B, and the inclined end, ($d$) forms a dove-tail as clearly shown in Fig. 2. The cutting portion is then secured to the screw, A, by a screw ($e$) (see dotted lines in Fig. 2) and a dowel, ($f$) also shown by dotted lines in Fig. 2, which serves to prevent any working or play, between the cutting portion, B, and the screw, A.

The bit, B, may be used with or without the worm or center screw. For many purposes of a tree-nail auger it is better without. There may be but one dowel or more, but one is sufficient and this need not be of much strength, as there is very little side pressure upon it. The screw, Fig. 10 should be strong and made to fit close. Each bit made for the stock should be fitted accurately and numbered and lettered to correspond with the stock. For instance a series of stocks, A, may be made and marked with the letters of the alphabet. To each one of these stocks there may be several sizes of bits, with a shade of difference marked, for instance "A, 1," "A, 2," "A, 3," &c., all of which would be adapted to the stock marked, "A," and thus the borer, if supplied with a proper number of auger stocks and the various Nos. of bits, would be able without loss of time to bore for any size of tree nail.

I have in this improvement in augers accomplished a great saving of time to the borer. Often times the half of a day is lost while the borer seeks a new auger and gets his broken one mended, or gets the size of it adapted to a new lot of tree nails. In my auger the borer, on breaking the bit against an iron bolt or on receiving a new lot of tree nails of a different size, has but to unscrew one bit and put on another, and as the stocks are for permanent use, he can afford to have them made of cast steel and polished so as to free themselves easily, which could not be afforded if the bit were welded to the stock. My adaptable bits have also the advantage of being more nicely tempered than they could be if united with the stock.

The cutting portion may be of any of the usual or known forms, and therefore my improvement may be applied to the various kinds of augers, in use for different kinds of work. The advantage of the improvement is obvious, for it is well known that the cutting part of an auger, will not admit of much filing, and consequently a limited amount of usage is obtained, and the cutting portion, is often completely destroyed, by coming in contact with nails or bolts; in such cases the augers of present construction are rendered entirely useless, and new ones are required. By my improvement a new cutting portion is only required, the screw, A, not being subject to wear, will last an indefinite period of time.

I do not confine myself to the precise method herein shown, for connecting the cutting portion to the screw, for trifling variations may be made.

I do not claim making the cutting portion of the auger, detached from the screw portion, irrespective of the precise mode of attachment herein shown.

What I claim as new and desire to secure by Letters Patent, is—

Attaching the cutting portion B of the auger to the screw portion as herein shown and described viz by means of the dove tail notch formed by the shoulder (b) and inclined end (d), dowel f, and screw (e).

I. W. HOAGLAND.

Witnesses:
WILLIAM A. IAQUINS,
HORACE C. TURSE.